(12) United States Patent
Drako et al.

(10) Patent No.: US 8,122,493 B2
(45) Date of Patent: Feb. 21, 2012

(54) FIREWALL BASED ON DOMAIN NAMES

(76) Inventors: Dean M. Drako, Los Altos, CA (US);
Zachary S. Levow, Palo Alto, CA (US);
Fleming M. Shi, Cupertino, CA (US)

( * ) Notice: Subject to any disclaimer, the term of this patent is extended or adjusted under 35 U.S.C. 154(b) by 1428 days.

(21) Appl. No.: 11/657,863

(22) Filed: Jan. 25, 2007

(65) Prior Publication Data

US 2008/0184357 A1    Jul. 31, 2008

(51) Int. Cl.
*H04L 29/06* (2006.01)
*G06F 15/16* (2006.01)
(52) U.S. Cl. .......................... 726/11; 713/154
(58) Field of Classification Search .................. 713/154
See application file for complete search history.

(56) References Cited

U.S. PATENT DOCUMENTS

| | | | |
|---|---|---|---|
| 5,805,820 A * | 9/1998 | Bellovin et al. ............... | 709/225 |
| 6,763,378 B1 | 7/2004 | Hamilton, II et al. ......... | 709/223 |
| 6,829,654 B1 | 12/2004 | Jungck .......................... | 709/246 |
| 6,857,018 B2 | 2/2005 | Jiang ............................. | 709/225 |
| 6,907,525 B2 | 6/2005 | Pazi et al. ..................... | 713/170 |
| 7,010,585 B2 * | 3/2006 | Asami ........................... | 709/220 |
| 7,152,118 B2 * | 12/2006 | Anderson et al. ............. | 709/245 |
| 7,623,518 B2 * | 11/2009 | Faulk, Jr. ....................... | 370/392 |
| 7,792,994 B1 * | 9/2010 | Hernacki ....................... | 709/245 |
| 2002/0040400 A1 * | 4/2002 | Masters ........................ | 709/228 |
| 2004/0103322 A1 * | 5/2004 | Wesinger et al. ............. | 713/201 |
| 2005/0063400 A1 * | 3/2005 | Lum .............................. | 370/401 |
| 2005/0262239 A1 * | 11/2005 | Kawakita ...................... | 709/224 |

* cited by examiner

*Primary Examiner* — Matthew Smithers
(74) *Attorney, Agent, or Firm* — Patentry

(57) ABSTRACT

The invention is a firewall capable of blocking access to a website or other Internet node based on a domain name. A DNS request is monitored and a domain name is decoded from the DNS request. An IP address is received in a response to the DNS request. The IP address and domain name are associated with each other. The steps are executed non-intrusively with respect to traffic flow through the firewall. Afterward, a determination is made if the IP address is associated with a domain name for which access is restricted. If the domain name is a restricted domain name, access to content of the website is denied by blocking traffic flow on the basis of identifying the source IP address of data packets.

6 Claims, 3 Drawing Sheets

FIREWALL BASED ON DOMAIN NAMES

TECHNICAL FIELD

The present invention relates to computer network security. More specifically, the invention relates to firewalls and selectively blocking access to Internet websites.

BACKGROUND ART

Communications and exchanging data among locations on the Internet continue to grow at a rapid pace. As one consequence, providing security for a computer network to prevent disruption of network operations is an increasing concern for network administrators. A security measure that has become standard practice is to install a "firewall" on the network. A "firewall" is defined herein as any chokepoint on a network that utilizes a set of rules to determine if access to or from the network should be allowed or denied. An attempt to access an Internet location, or website, is formatted within a protocol known as an Internet Protocol (IP). The location of a website is identified by an IP address.

The firewall screens data using a set of rules, typically input at the time of install by a network administrator. Screening may include content filtering. Alternatively or additionally, the rules base to allow or deny access may be based on three data sets: (1) a source IP address, (2) a destination IP address, and (3) the port being utilized for the communication. The Internet Protocol clearly defines the dynamics of this criteria. Also known are the techniques required to create firewalls based on this criteria.

A network user at a computer or other Internet-enabled device may initiate contact with a website by sending a request using the IP address of that website. However, the IP address is a long and awkward numerical address that is difficult to remember. Moreover, the IP address of a website may be dynamic. A domain name may be used instead. The domain name (for example, www.mywebsite.com) is a name that can be translated by the Domain Name Service (DNS) to an IP address. A Universal Resource Locator (URL) is typically based on a domain name with the protocol specified (http://www.mywebsite.com, for example). The URL is translated into the appropriate IP address by the DNS. Hence, a user request for access to a website will normally make two requests over the Internet. The first request is the DNS request to perform the translation of the domain name portion of the URL to an IP address. The second request is to that actual IP address of the requested URL.

The DNS is a system of servers distributed throughout the Internet. The DNS servers map the easy-to-remember domain names to their IP addresses. The Internet is large and widely distributed, and so are the DNS servers. For performance reasons, the DNS system may return multiple IP addresses in response. Also, to optimize routing, different IP addresses may be returned for identical DNS requests originating from different parts of the world. In addition, the IP addresses returned in response to identical DNS requests may change over various periods of time. Since a DNS request may result in a number of IP addresses being returned and those IP addresses changing over time, firewall screening based on IP addresses can be problematic.

SUMMARY OF THE INVENTION

In accordance with the invention, a method for selectively allowing access to a node external of a network includes monitoring Domain Name Service (DNS) requests at a network firewall. The network may be a local area network (LAN) or a wide area network (WAN). When a response to the DNS request is received, the IP address is identified and is associated with the domain name specified in the request. Thus, an association is made between the domain name and the IP address. This association is utilized to provide a determination of whether access to the external node is allowable. Depending upon this determination, access to the content of the external node is granted or denied. The association between the domain name and the IP address is stored and used for subsequent access determinations.

A rules base is generated on the basis of network concerns, such as security and productivity of employees. At least some of the rules identify domain names. The identified domain names may be a list of websites which have been determined to have undesired content. As an alternative, the listed domain names may be the limited number of websites for which access is to be granted. As another alternative, the domain names may be a mixture of allowed and banned Internet locations.

The rules base may include a lookup table that is used to record associations between the listed domain names and identified IP addresses. Since the IP addresses may change, the entries of the IP addresses are similarly dynamic. The lookup table is updated as name-to-address associations are determined.

The invention may be implemented as a computer-executable code stored on a computer-readable medium, which may be distributed or limited to a single device. The invention may also be implemented as a hardware device.

Elements of a network firewall in accordance with the invention include a DNS request monitor for decoding domain names embedded within DNS requests, a domain name rules base, and a receiver configured to accept an IP address as a response to each DNS request. An automatic update component is used to record current associations between IP addresses and domain names. A controller is configured to selectively deny access to websites based on the rules base and the recorded associations.

DETAILED DESCRIPTION

Figure 1:
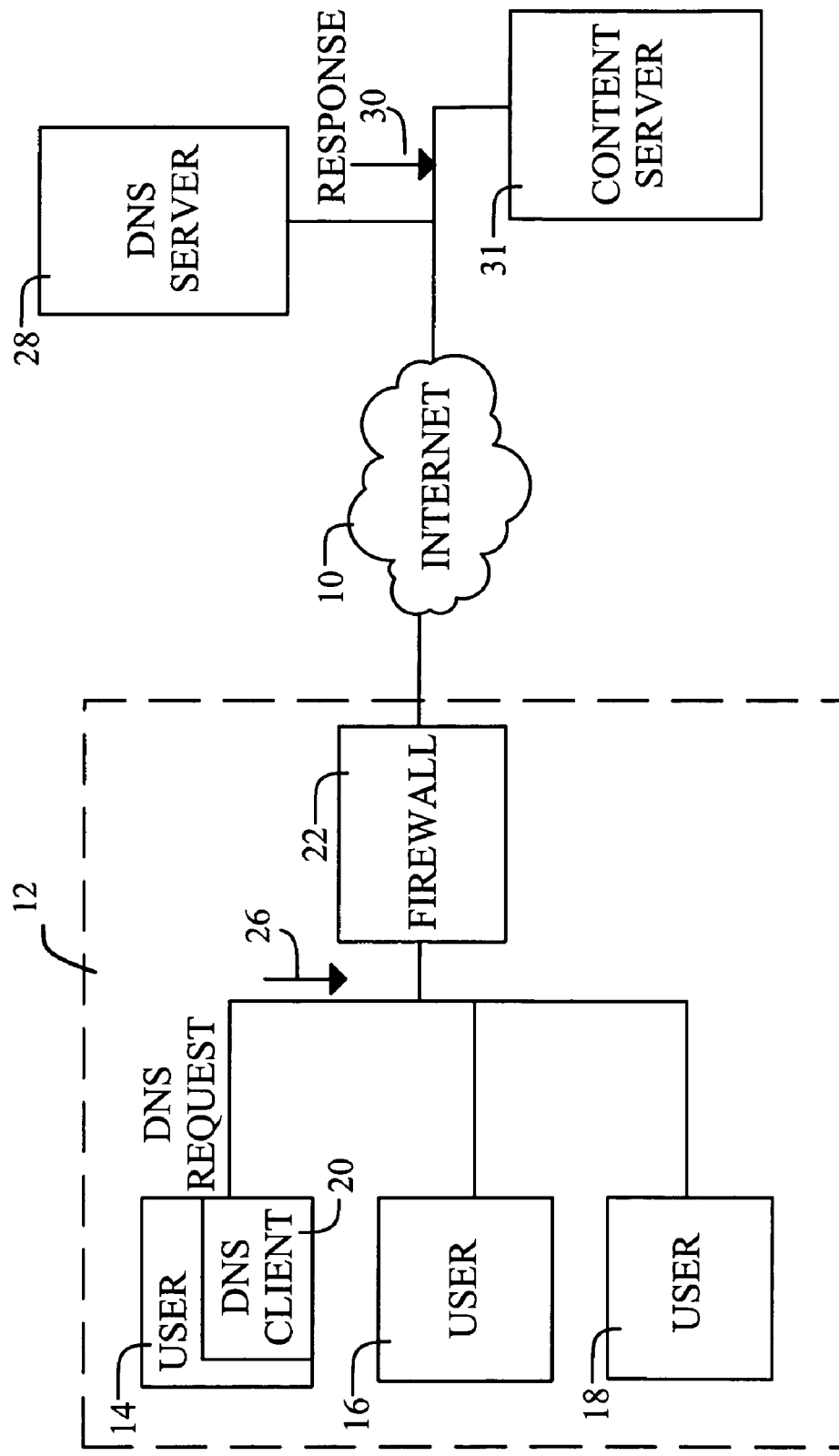
FIG. 1 is a schematic view of an Internet-connected network having a firewall for enforcing a rules base in accordance with one embodiment of the invention.

With reference to FIG. 1, a computer network 12 is shown as being connected to the global communications network referred to as the Internet 10. The computer network includes users 14, 16 and 18 and a firewall 22. Other, standard network components (e.g., a gateway) are not shown in order to minimize the complexity of the drawing. As used herein, a "user" is a computer or other Internet-enabled device.

When a user 14 targets access to a node, such as a website 31, that is connected to the Internet 10 and outside computer network 12, the user 14 enters a URL, which includes a domain name, into a computer application known as a web browser (not shown). As is known in the art, a DNS client 20 is a program which runs on a computer and generates a DNS request 26 on behalf of a web browser. The DNS request includes the domain name encoded within it.

The DNS request 26 is forwarded to a DNS server 28, which can be any one of a number of such servers accessible via the Internet 10. Utilizing a series of queries to other DNS servers, an Internet Protocol (IP) address is identified and sent as a response 30 to the DNS request. Upon successfully receiving the DNS response which contains the IP address, the web browser will attempt to access the website 31.

As is known in the art, a computer network 12 is susceptible to unwanted intrusions that may attempt to access the users 14, 16 and 18. These unwanted intrusions often contain a virus or other malicious software which can be planted into a user's computer 14 when these intrusions are performed. The virus can then propagate itself into the computers 14, 16 and 18, thereby disrupting operations of the entire network. It has become standard practice for network administrators to install a firewall 22 to combat intrusions such as these and other forms of intrusion known in the art. It has also become standard practice to configure the firewall to prevent requests from users 14, 16 and 18 for access to restricted websites to go out to the Internet 10.

Some available firewalls are designed to provide screening based on an IP address. Because the Internet 10 is a distributed global network, the servers 28 making up the Domain Name Service are also distributed. Moreover, the DNS is designed as a hierarchy of servers and the queries generated by a DNS request 26 must traverse this hierarchy. As a consequence of the combination of the servers being globally distributed and queries having to traverse a hierarchy of servers, multiple IP addresses may be returned for a single DNS request. Also, to provide redundancy, load balancing, fault tolerance and routing optimization, multiple IP addresses may be generated. To add to the complexity of the issue, IP addresses may change over time.

Given the complexities identified above, it can be seen that a firewall based on IP addresses would require a very large and ever-changing set of rules in order to properly screen designated content servers 31 and other designated external nodes from gaining access to the computer network. The domain name translated into DNS request 26 remains the same, no matter how many IP addresses are returned in response to the DNS request. Rather, domain names are fixed. Therefore, having a firewall based on domain names would have advantages over those of the prior art.

Figure 2:
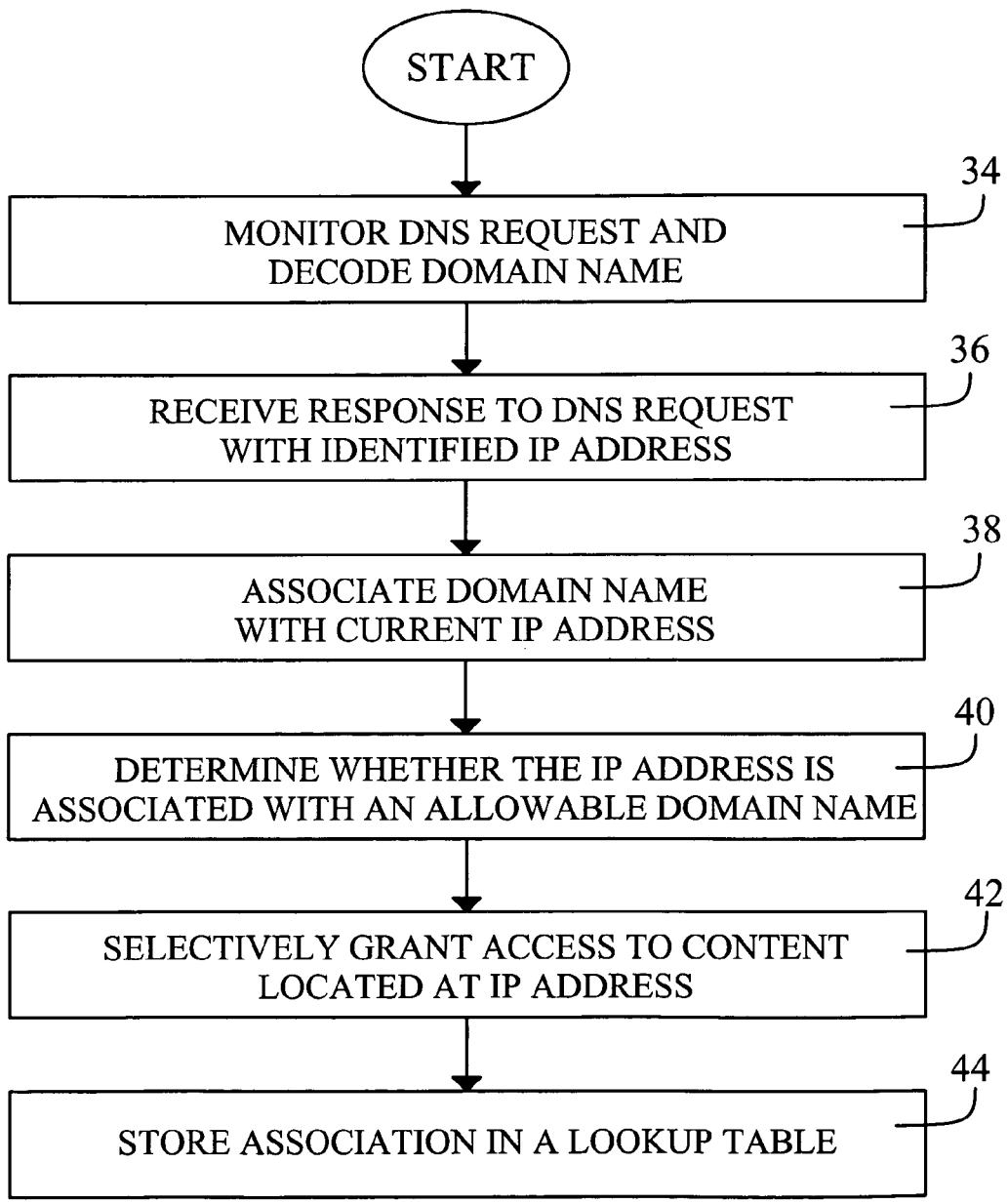
FIG. 2 is a process flow of steps for implementing the invention.

Referring to FIGS. 1 and 2, a method of implementing a firewall of the present invention is depicted. The method comprises a step 34 of monitoring a DNS request 26. Monitoring the DNS request includes detecting the DNS request 26 and decoding the domain name embedded in the DNS request. This occurs at the firewall 22. At step 36, the firewall receives the response 30 and identifies the current IP address for the domain name that was the subject of the original request 26. Associating the current IP address with the domain name takes place in step 38.

Steps 34, 36 and 38 are executed non-intrusively with respect to network traffic. That is, the steps of monitoring requests, receiving responses, and associating a domain name with a current IP address occur without information filtering and without adversely affecting the flow of packets between the network 12 and the Internet 10. For example, IP address information may pass freely through "Port 23" and a particular network protocol, but the invention is not restricted to a single protocol.

After the domain name has been associated with a current IP address at step 38, intrusive monitoring can occur, for example at "Port 80." At step 40, it is determined whether data exchanges are allowable. The firewall 22 may include a rules base that identifies particular domain names. Incoming data packets from the content server 31 of FIG. 1 will include the source address of the packets. That is, the data packets will include the IP address of the content server 31. If the content server distributes content for a prohibited domain name, the method is able to detect the potential rule breach as a result of the associating that occurred in step 38. In step 40, the firewall determines whether the IP address identified in an incoming packet is associated with an allowable domain name. If so, the packet is allowed to pass to the requesting user computer 14. On the other hand, if the IP address is determined to be associated with a restricted domain name, passage of the packet is prohibited. This is indicated at the step 42 of selectively granting access to content located at the source IP address of the packet.

In step 44, the domain name-to-IP address association from step 38 is stored, such as in a lookup table for a rules base. In the process flow of steps of FIG. 2, the storage of the association is shown as occurring after steps 40 and 42, but this is not a required sequence. For example, steps 38 and 44 may be merged, so that the domain name-to-IP address association is readily accessible upon implementation of steps 40 and 42. The lookup table may be updated each time that a DNS request is made. As described above, the DNS transaction is monitored non-intrusively, but content transactions are monitored intrusively.

Figure 3:
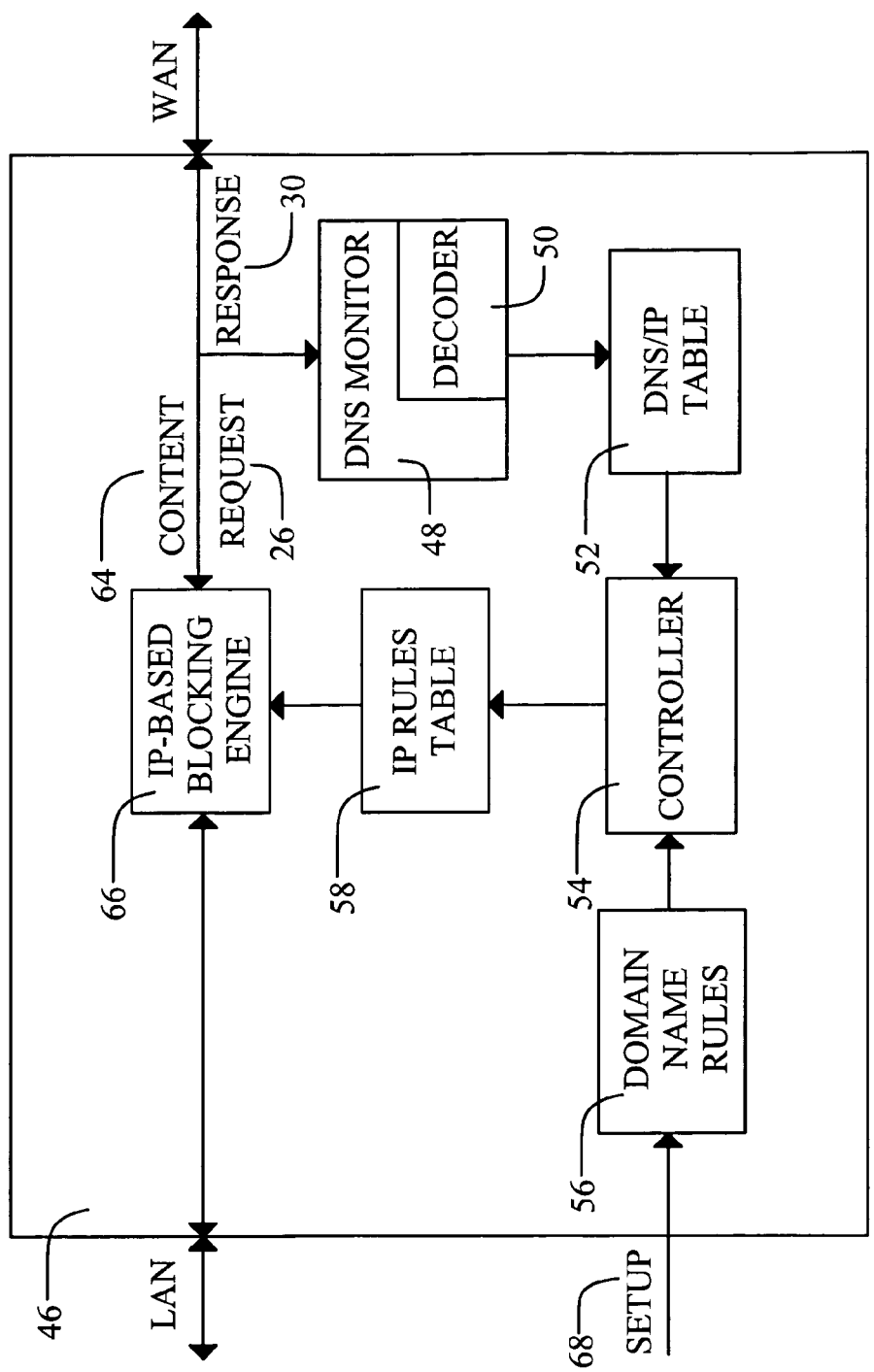
FIG. 3 is a block diagram of firewall components in accordance with the invention.

Referring to FIG. 3, in one embodiment of the invention, a firewall 46 includes a DNS monitor 48, a receiver 52, DNS/IP table 52, a controller 54, domain name rules 56, IP rules table 58, and an IP-based blocking engine 66. The DNS monitor 48 detects a DNS request 26 as it is being communicated to the Domain Name Service 28. The monitor includes a decoder 50 which decodes the domain name that is embedded within the DNS request. The monitor is configured such that neither the detecting of the DNS request nor the decoding of the domain name interferes with communication of the DNS request to the Domain Name Service. That is, the monitoring of the DNS request is non-intrusive. The decoded domain name is input to the DNS/IP table 52.

The DNS monitor 48 is also configured to receive an IP address from the Domain Name Service 28 returned as a response 30 in the DNS transaction. Immediately upon receiving the IP address, the DNS monitor inputs the IP address into the DNS/IP table and associates the previously decoded domain name with the IP address, thereby forming a domain name-to-IP address association. The DNS monitor 48 does not intrude upon the IP address being utilized elsewhere in the computer network. Thus, the operations of the firewall continue to be non-intrusive with respect to the DNS transaction.

The function of the controller 54 is to enforce the domain name rules to selectively allow or deny access to a website or other Internet node. The domain name rules are established using a setup 68 methodology via a communications channel over a command line interface, a web based interface or other solutions well known in the art. The controller compares the domain name from the domain name rules with the domain name portion of the association. The domain name rules identify the domain name for which access is restricted and/or allowed. If a match is found, the controller records the association in the IP-based rules table 58. Thus, the domain name rules 56 are utilized by the controller 54 in conjunction with the DNS/IP table 52 to create the IP-rules base 58. Access to content 64 from the current IP address is controlled in accordance with the relevant domain name rule by the IP-based blocking engine 66. The IP-rules base table may be a lookup table that is utilized for subsequent enforcement of the rules base.

As previously noted, there may be more than one IP address that is received in response to a single DNS request 26. Reasons for returning multiple IP addresses include providing redundancy and enabling load balancing. When multiple IP addresses are returned for a single DNS request, the requested domain name is associated with each IP address. The DNS/IP table 52 and IP-rules base table 58 are updated accordingly. Then, the domain name rules 56 are enforced equally for the IP addresses associated with the domain name. The associations are maintained until a later DNS request involving the same domain name results in return of a different IP address.

While the invention has been described as one in which the domain name-to-IP address associations are stored in a lookup table, this is not critical. There may be other approaches for storing the associations without diverging from the invention.

What is claimed is:

1. An apparatus for enforcement of a rules base to selectively restrict access to a server with an IP address exterior of a network comprising:
   a domain name rules base having identifications of restricted and/ or allowed domain names;
   an automatic update component for recording current associations between IP addresses and said restricted and/or allowed domain names, said automatic update component being responsive to a receiver configured to accept an IP address and a domain name as a response to a Domain Name Service (DNS) request for decoding domain names; and
   a controller configured to selectively control access to said IP addresses based on said rules base and said associations.

2. The apparatus of claim 1 further comprising
   a receiver configured to accept an IP address as a response to a Domain Name Service (DNS) request for decoding domain names.

3. A method for selectively allowing access to a node exterior of a network comprising:
   receiving an IP address identified in a response to a request to a Domain Name Service (DNS) server, said response including a domain name for said node;
   associating said IP address with said domain name, thereby providing an association of said IP address with said domain name; and
   recording said association;
   inputting rules to a rules base for allowing access to said node, said rules base identifying a plurality of domain names.

4. The method of claim 3 wherein said rules base includes a lookup table having a plurality of said associations.

5. Computer-executable code stored on a computer-readable hardware device for enabling a method comprising:
   receiving an IP address for a website as a response to a Domain Name Service (DNS) request, said DNS response including a domain name for a specific website,
   enabling enforcement of a rules base that includes rules restricting access to particular domain names said rules base, including providing an association of said IP address and said domain name;
   enforcing said rules base to selectively grant access to said website, thereby providing an enforcement of said rules base; and
   dynamically updating said rules base for subsequent said enforcements.

6. The computer-executable code of claim 5 wherein said enforcement includes an enforcement based on said association of said IP address and said domain name.

* * * * *